US011076469B2

(12) United States Patent
Feeney

(10) Patent No.: US 11,076,469 B2
(45) Date of Patent: Jul. 27, 2021

(54) VISUAL TRACKING SYSTEM AND METHOD

(71) Applicant: Liam Feeney, Tonapubble (IE)

(72) Inventor: Liam Feeney, Tonapubble (IE)

(*) Notice: Subject to any disclaimer, the term of this patent is extended or adjusted under 35 U.S.C. 154(b) by 0 days.

(21) Appl. No.: 16/798,327

(22) Filed: Feb. 22, 2020

(65) Prior Publication Data

US 2020/0221560 A1 Jul. 9, 2020

Related U.S. Application Data

(63) Continuation of application No. 16/538,815, filed on Aug. 12, 2019, now Pat. No. 10,575,389, which is a continuation-in-part of application No. 15/735,157, filed as application No. PCT/EP2016/063225 on Jun. 9, 2016, now Pat. No. 10,405,413.

(30) Foreign Application Priority Data

Jun. 9, 2015 (IE) .................................... S20150171

(51) Int. Cl.
| | |
|---|---|
| *H05B 47/155* | (2020.01) |
| *G06F 3/033* | (2013.01) |
| *G02B 26/08* | (2006.01) |
| *G06F 3/0481* | (2013.01) |

(52) U.S. Cl.
CPC .......... *H05B 47/155* (2020.01); *G02B 26/08* (2013.01); *G06F 3/033* (2013.01); *G06F 3/04812* (2013.01); *G06F 3/04815* (2013.01)

(58) Field of Classification Search
CPC ...... G06F 3/04812; G06F 3/033; G06F 3/011; G06F 3/04815; G06F 3/0481; G06F 3/0304; G06F 3/0415; H05B 47/175; H05B 47/10; H05B 47/155; H05B 47/125; H05B 47/115; G09G 2320/0686;
(Continued)

(56) References Cited

U.S. PATENT DOCUMENTS

| | | | |
|---|---|---|---|
| 5,790,124 A | * | 8/1998 | Fischer ................... G06T 15/10 345/473 |
| 5,953,151 A | | 9/1999 | Hewlett |

(Continued)

FOREIGN PATENT DOCUMENTS

| | | |
|---|---|---|
| GB | 2499123 A | 8/2013 |
| WO | 2009130521 A1 | 10/2009 |

OTHER PUBLICATIONS

PCT/EP2016/063225, International Search Report and Written Opinion (dated Oct. 20, 2016).

*Primary Examiner* — Haissa Philogene
(74) *Attorney, Agent, or Firm* — Loza & Loza, LLP; Anthony Smyth

(57) ABSTRACT

The present invention is directed to a user-operated spotlight system and method for lighting a performer on a stage or performance space; the user-operated spotlight system comprising a screen which displays an image of the stage and a cursor, a screen cursor positioner adapted to be operated to move the cursor on the screen, a processor connected to the screen, and, a plurality of controllable spotlights which are connected to the processor and which plurality of controllable spotlights can be moved by a user moving the cursor on the screen. The advantage of providing such a user-operated spotlight system is that a single user can operate a plurality of spotlights.

19 Claims, 9 Drawing Sheets

(58) Field of Classification Search
CPC ....... G09G 2320/0693; G09G 2354/00; G09G 2340/14; G02B 26/08; G01S 3/7864
See application file for complete search history.

(56) References Cited

U.S. PATENT DOCUMENTS

| | | | |
|---|---|---|---|
| 6,079,862 A * | 6/2000 | Kawashima | H05B 47/125 |
| | | | 382/103 |
| 6,412,972 B1 | 7/2002 | Pujol et al. | |
| 6,529,853 B1 | 3/2003 | Bauer | |
| 7,656,413 B2 * | 2/2010 | Khan | G06F 3/0481 |
| | | | 345/589 |
| 8,057,069 B2 | 11/2011 | Mangiardi et al. | |
| 8,089,455 B1 * | 1/2012 | Wieder | G06F 3/042 |
| | | | 345/156 |
| 8,144,123 B2 * | 3/2012 | Denoue | G06F 3/0304 |
| | | | 345/157 |
| 9,526,156 B2 * | 12/2016 | LaDuke | H05B 47/155 |
| 9,551,779 B2 * | 1/2017 | Glazer | H04N 5/23296 |
| 10,231,051 B2 | 3/2019 | Guo | |
| 10,405,413 B2 | 9/2019 | Feeney | |
| 10,575,389 B2 * | 2/2020 | Feeney | G06F 3/04812 |
| 2009/0009984 A1 | 1/2009 | Mangiardi | |
| 2010/0303297 A1 | 12/2010 | Mikhailov et al. | |
| 2011/0285854 A1 | 11/2011 | Laduke et al. | |
| 2015/0091446 A1 | 4/2015 | Ohta et al. | |
| 2016/0184719 A1 | 6/2016 | D'Andrea et al. | |

* cited by examiner

VISUAL TRACKING SYSTEM AND METHOD

PRIORITY

This application is a continuation of U.S. patent application Ser. No. 16/538,815 filed in the U.S. Patent Office on Aug. 12, 2019, which is a continuation in part of U.S. patent application Ser. No. 15/735,157 filed in the U.S. Patent Office on Dec. 8, 2017, which issued as U.S. Pat. No. 10,405,413 on Sep. 3, 2019, and that was a national stage entry of PCT Patent Application No. PCT/EP2016/063225 filed on Jun. 9, 2016, which claimed priority from Irish Patent Application No. S20150171 that was filed in the Irish Patent Office on Jun. 9, 2015, the entire content of these applications being incorporated herein by reference as if fully set forth below in its entirety and for all applicable purposes.

TECHNICAL FIELD

The present disclosure relates generally to a visual tracking system and method including, for example, a performance space lighting system and method, and more particularly, to visually tracking a source of performance.

BACKGROUND

In stage performances, a performer should ideally be lit from multiple angles to minimize shadows including, for example, a front angle, a left-side angle, a right-side angle and a rear angle. Therefore, each performer would ideally have several lights directed towards them.

As a performer moves about the stage, these lights need to be moved in order to continue to illuminate the performer from these various angles. Such light sources are used to illuminate a moving performer. Each light source, where that light source is manually operated, will require one operator. The operator must typically be versed in the performer's movements and be vigilant to move the light source in coordination with the performer's movements. When lighting a performer from four angles, for example, and using the key lighting method, four operators are needed to illuminate each performer. As there could be several performers onstage at the same time, theoretically this would require tens of operators to be positioned in areas above the stage and in areas surrounding the stage area in order to operate all of the light sources. This is not practical and oftentimes there is only enough space for approximately six operators, even in the large theatres, who then must divide their time between operating different spotlights which are focused on different performers at different times during the performance. This is undesirable as the lighting of the performers will be sub-optimal and therefore will impact on the overall performance.

For a number of years now fully automated spotlight systems have been known. Such a fully automated spotlight systems typically use radio frequency (RF) transmitters which are worn by each of the performers in order to triangulate a performer's position on the stage. Several RF receivers positioned about the edges of the stage are used to calculate the performer's approximate position on the stage by determining the strengths of the RF signal received at the RF receivers. It will be appreciated that such systems are prone to error as the accuracy of RF triangulation is not precise enough to capture small movements by the performers.

Further developments of such fully automated systems have incorporated infrared (IR) transmitters and IR receivers in order to better determine the position of the performers on the stage. Such IR-based systems are more accurate than the RF-only systems but the IR-based systems still use the RF transmitter and receivers as the primary means of performance position determination. In these IR systems, the IR transmitter and IR receiver are used as a secondary positioning system to further refine the determination of the performer's position and the IR transmitter and receiver system is also used as a backup in the case that the RF system is not operating correctly.

More recently, such fully automated systems have incorporated gyroscopes into the units that are worn by the performers in order to assist with understanding whether a performer has moved slightly in one direction, or if the performer has moved to a kneeling or prone position on the stage. Such small movement can be detected using the gyroscope, but the accuracy is not perfect and there remain issues with these types of prior art systems as discussed further hereinbelow.

Nonetheless there are still issues with these fully automated systems. For example, should a performer raised a hand to display an object, the position of the performer on the stage will not have changed however it would be best if the spot lighting could be moved slightly upwardly to better illuminate the performer's raised hand so that the audience could clearly see the object held aloft. In other circumstances, the performer may lean slightly to the left or to the right such that the performer's head may move out of the beam of the light source, but the performer's waist may not have moved as they are only leaning. In this scenario, the fully automated systems may not be able to detect such movement and will not move the lights accordingly. In situations where the performer has only changed position to a small degree, fully automated spotlight systems will not have the ability to recognise or detect all of these movements and hence will not be able to move the spotlights in the appropriate manner so as to illuminate the performer correctly.

Furthermore, in other scenarios it is desirable to light specific areas of the stage at specific points even if there is no performer in the vicinity of that stage point at that time. With the fully automated systems which rely on the presence of an RF signal and/or an IR signal, it is not possible to do so. It would be necessary in such scenarios to have a dedicated light which is directed towards that area of the stage which can then be switched on and switched off as needs be during the performance. For the remaining portion of the performance this dedicated light would not be used which is an inefficient use of the lighting resources.

It can be seen that lighting a stage during a performance can be viewed as an art form which is best carried out by a human operator. However, to operate all of the required lights in a fully manually operated system is very difficult from the point of view of having enough space in the area surrounding the stage, and, even if it were possible to position enough operators in the area surrounding the stage, the costs to do so would be quite high.

It is a goal of the present invention to provide a method and system that overcomes at least one of the above mentioned problems. In particular, it is desirable to provide a system which will allow the input of a human operator to take cognisance of minor movements of performers on the stage and introduce a human input to the movement of the lights, whilst at the same time allowing a single operator to operate a plurality of the spotlights concurrently.

SUMMARY

Certain embodiments disclosed herein, as set out in the appended claims, provide systems, methods and apparatus directed to a user-operated spotlight system for lighting a performer on a stage or other performance space; the user-operated spotlight system comprising at least one camera which points at the performance space, a screen which displays an image of the performance space captured by at least one camera and a cursor, a screen cursor positioner which can be operated to move the cursor on the screen, a processor connected to the screen, and, a plurality of controllable spotlights which are connected to the processor and which plurality of controllable spotlights can be moved by a user moving the cursor on the screen.

In one embodiment there is provided a user-operated spotlight system for lighting a performer on a stage or other performance space; the user-operated spotlight system comprising a screen which displays an image of the performance space and a cursor, a screen cursor positioner adapted to be operated to move the cursor on the screen, a processor connected to the screen, and, a plurality of controllable spotlights which are connected to the processor and which plurality of controllable spotlights can be moved by a user moving the cursor on the screen.

The advantage of providing such a user-operated spotlight system is that a single user can operate a plurality of spotlights. This reduces the number of operators required for operating the various spotlights. Previously, manually operated spotlights required one operator for each spotlight. As the plurality of spotlights are operated by a user, the spotlights can be operated in fashion which suits the performer's needs and introduce a human element into the movement of the lighting which can add to the overall performance. For example, the operator could move the spotlights slightly to better illuminate a performer's raised hand. It will be appreciated that the system does not receive the data, and simply converts the position of a mouse cursor mathematically into a DMX position for the moving light or other protocol for a projector, camera pan-tilt system or scenic control system.

In a further embodiment, a pre-performance calibration stage is carried out. In one embodiment, in order to calibrate the user-operated spotlight system, at least two cursor positions on the screen displaying the performance space are linked with at least two positions in the performance space, whereby the cursor positions on the image of the performance space relate to the actual positions on the performance space itself. The calibration of at least two cursor positions with at least two positions in the performance space is carried out for each of the plurality of spotlights, such that by pointing the cursor at a position on the image of the performance space shown on the screen, at least some of the plurality of spotlights will be controlled to direct their beams towards that actual position on the performance space itself. It will be appreciated that any problems/characteristics of the lens can be overcome using more reference points and applying the appropriate mathematical algorithm. In other words, multiple calibration points for the system can be used in the set-up.

Systems and methods incorporate a calibration process where the system is provided with a reference position to mathematically calculate "numeric data" and convert into a protocol that a lighting fixture, motorized camera, or scenic control system can understand and in turn points to by moving its motors or the image as in the case of a projector.

In a certain implementations, a camera faces the performance space in the same direction that the audience faces the performance space. In some implementations, the angle of the camera relative to the plane of the performance space is provided in the calibration performance space to allow the spotlights to focus at a position on the plane of the performance space.

In certain aspects of this disclosure, a camera may be referred to as being a stationary camera or a moveable camera. A camera may be stationary in the sense that it is located at or above a fixed and unchanging point. A moveable camera may be equipped with motors or actuators that can adjust pan and tilt of the camera. In some instances, a moveable camera may be equipped with motors that control other operational aspects of the camera, including zoom and/or focus. In some instances, a moveable camera may be equipped with motors or actuators that cause the camera to move with respect to the performance area.

In a further embodiment, the screen cursor positioner is a mouse. In a further embodiment, the screen cursor positioner is a trackball. In a further embodiment, the screen cursor positioner is a trackpad. As a user moves the cursor on the screen using the screen cursor positioner, the spotlights are controlled to move their beams around the actual performance space, following the movement of the cursor across the performance space image on the screen.

In this way, a user can follow a performer around a stage or performance space in an unplanned movement route, and by keeping the cursor over the performer on the screen, the spotlights for illuminating that performer are controlled so as to always focus on the performer.

In a preferred embodiment, the cursor is kept over a performer's feet. In another embodiment, the user-operated spotlight system takes account of a performer's height and adjusts the focus and direction of the spotlights, associated with that performer, from the plurality of spotlights.

In a further embodiment, different sections of the performance space can be accorded different heights relative to the plurality of spotlights, such that the plurality of spotlights will adjust to correctly focus together at the correct height for these different sections of the performance space.

In a further embodiment, the height of the camera relative to the plane of the performance space is used in the calibration stage.

In a further embodiment, the distance of the camera from a centre point of the performance space is used in the calibration stage. The camera may be a stationary or moveable camera.

In one embodiment a number of camera images can be stitched together to form a panoramic view of the performance space in which the performance is taking place.

In one embodiment the system and the method may be configured to automatically control a plurality of parameters of a moving light automatically. This control extends to any parameter that can adjust the light, for example Iris, Zoom, focus and colour. This control is based upon position in the performance space or preprogramed location that elicit an automatic response from the system. The system and the method can be applied to moving cameras, moveable cameras, stationary cameras, projection systems, scenic control systems and audio systems such as microphones.

In one embodiment the system is configured to compensate for variations in height of a stage structure or structure of a performance space. These items include ramps, steps and risers.

In one embodiment the system is configured with an intelligence and control instructions to current follow spotlights and configure said spotlight as a master follow spot and have any number of systems such as moving lights, projectors, scenic controls, performer flying systems all follow the spot of the light source.

In one embodiment the camera can be fixed and not move during operation.

In one embodiment the camera is mounted on a moving light and configured to move in tandem with the light itself.

In one embodiment the system is configured with "centring of the head" function by providing a control in the system that spins a head and then allows the operator to remove the non-concentricity of the rotation thereby increasing accuracy.

In one embodiment calibration of a visual tracking system may employ an apparatus that suspends a camera on a pendulum, thereby causing the camera to hang in vertical alignment, regardless of mounting position. The pendulum suspension causes the camera to be mounted with its vertical axis at right angles to the plane of the earth, regardless of the mounting position. While suspended by the pendulum, the camera produces an image that is aligned to the horizon. The camera may then be tilted for calibration purposes, and when mounted in its final location, using a gimbal or brackets, the calibration information can be used to configure and adjust images produced by the camera.

In one embodiment the system can employ software code or similar to activate or deactivate the light, camera, flying system, projector or other system that can be controlled and independently control these systems to carryout calibration or testing.

In one embodiment the system can control a light, camera, projector or other and independently move their axes to provide a calibration routine or system check routine for accuracy or performance.

In one embodiment the system is configured to perform compound moves of axes, or of systems in conjunction with each other such as lights, projection, flying and rigging systems in order to check accuracy or check function.

In one embodiment the system can perform an adaptive calibration, i.e. drive the light to a point and check with the operator if its location is accurate.

In one embodiment the system can be made to automatically perform a calibration routine for one or for any and all lights, projectors, moving cameras, moveable cameras, stationary cameras, flying and rigging systems.

In one embodiment the system is configured to work with a single video feed and or multiple video feeds switched in and out and or multiple video feeds stitched into one continuous video image that may be provided to a display screen.

In one embodiment the system can switch which lights it uses, or other systems operated by on board processor or an auxiliary lighting processor.

In one embodiment the system employs an infrared or other wavelength light source that overcome the natural limits of an operator's eyesight.

In one embodiment the system can employ processing to place tags, or a similar notation, saved pre-set or similar on a screen or by memory recall to provide a point of reference in the instance of working in a black-out.

In one embodiment the system can be used in conjunction with video glasses with the system.

In one embodiment integration of 3D mapping with the system is performed.

In one embodiment there is provided an external hardware module to interface with the system to provide a dedicated hardware control for features of the software.

For example, the external hardware module can be a lump of metal that looks and feels like a follow spot to operate but it is a remote control for the mouse or lighting desk, etc.—it just gives the "feel" of a follow spot. In one embodiment the hardware module can be incorporated into a flight case, for example an emulator. The emulator is dimensioned to point at a monitor—moving the cursor around—but by moving the screen it's pointing at away or nearer the operator one can essentially limit the travel of the emulator in the pan and tilt directions. This can be a feature for limiting how far an operator moves the system, can be used to "size the ergonomics" for different operators or indeed it can be used to position an operator in a seat at the correct distance from the screen to "smooth" out their movements.

It will be appreciated that the distance from the emulator to the screen can be set in such a way to make operation more ergonomic for the operator.

In one embodiment there is provided a user-operated spotlight system for lighting a performer on a stage or performance space; the user-operated spotlight system having an emulator adapted to communicate with at least one spotlight, a processor connected to the emulator, and, a plurality of controllable spotlights which are connected to the processor and which the plurality of controllable spotlights can be moved by a user moving the emulator to control the plurality of spotlights.

The emulator can be embodied as a hardware module and incorporated into an existing spotlight or follow spot, which in turn can be used to control a plurality of lights where the follow spot or existing spotlight acts as a master light control with the emulator incorporated therein.

In a further embodiment there is provided a method of operating a spotlight system for lighting a performer on a stage or performance space; the method including the steps of displaying an image of the performance space on a screen and a cursor, configuring a screen cursor positioner to be operated to move the cursor on the screen, and connecting the screen and a plurality of controllable spotlights which plurality of controllable spotlights can be moved by a user moving the cursor on the screen.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of some embodiments thereof, given by way of example only, with reference to the accompanying drawings, in which:

FIG. 5a is a diagrammatic view of a hardware setup for a user-operated spotlight system in accordance with the twin camera embodiment of FIG. 4a;

DETAILED DESCRIPTION

The present invention relates to a user-operated spotlight system effected by a video camera being mounted over a stage or performance space, at some angle, in order that the viewing angle of the camera covers the entire stage, so that entire stage is presented to a human operator on a computer screen, which displays the image captured by the camera via video stream. Therefore, a stage performer will be seen by the operator on a computer screen. The operator is directing moving light beams, which are referred to as light sources or spotlights also, to light the performer by placing a cursor which is also shown on the computer screen at the performer's feet. The present invention will receive the cursor position on the screen and will calculate the required amount of pan and tilt movements needed to direct the moving lights to light the stage performer at the point on the stage where the cursor is overlaying on the screen image on the stage on the computer screen. This provides the moving lights which are controlled the functionality of a conventional light source. When the stage performer moves, the operator will follow the performer's feet by moving the cursor on the screen to continue to overlay on the performer's feet, using a mouse or trackpad or such similar device, thus directing the moving light to follow the performer.

In essence, the present invention converts a screen cursor position to an associated stage position. The system is initially calibrated so that a cursor overlaying a point of the image of the stage shown on the screen will be associated with that actual position on the actual stage. Hence, the moving lights will be moved to focus their beams on that stage position when the cursor is moved to that associated screen position.

Figure 1:
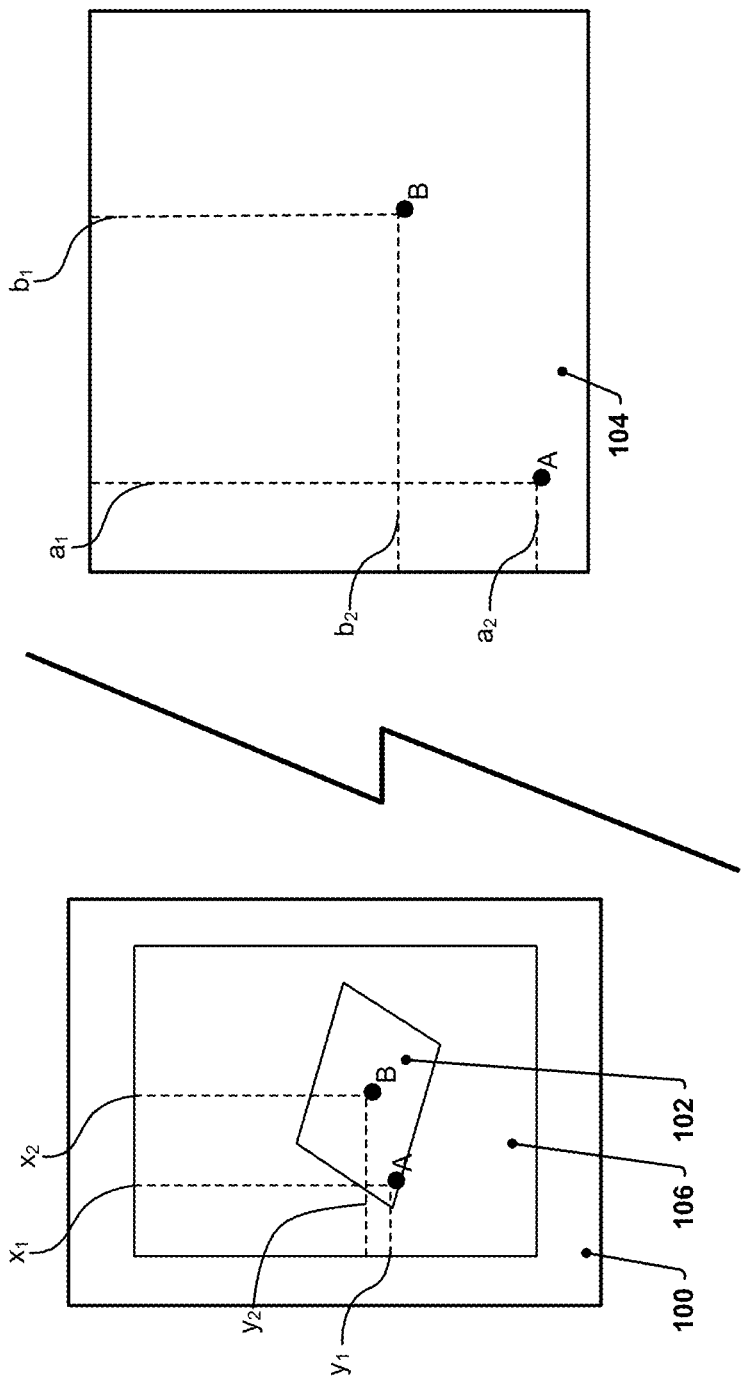
FIG. 1 is a diagrammatic view of a user-operated spotlight system in accordance with the present invention, showing a screen displaying an image of a stage and the actual stage itself.

Referring to FIG. 1, there is provided an operator screen 100. The screen 100 displays an image 102 of a stage, whereby the stage is located remotely from the screen 100. A cursor 106 is also displayed on the screen 100. FIG. 1 also shows the stage 104 itself.

Two points A and B are shown on the stage 104. The position on the stage of point A is given by the co-ordinates (a1, a2). A moving light, in the form of a spotlight would be able to direct its beam on point A when given the co-ordinates (a1, a2). The associated cursor position on the screen 100 is (x1, y1). Regarding point B, the stage position co-ordinates are (b1, b2) associated with (x2, y2). As can be seen, due to the perspective view of the stage 104 on the screen 100, the values y1 and y2 are relative close together, when in fact the actual co-ordinates for these positions in that same axis a2 and b2 are relative far apart. During the calibration process, the cursor positions on the screen, which in essence are the pixel positions on the screen, must be associated with the actual stage co-ordinates through the development of a translational function which will convert the cursor position on the screen to the correct stage position. If the cursor is positioned on the screen 100 to overlay the frontmost, leftmost point on the stage 104, then the cursor position co-ordinates should be translated and converted to the frontmost, leftmost stage position co-ordinates. This conversion is carried out in a processor (not shown) which forms part of the present invention. The stage position co-ordinates from the processor are transmitted to the plurality of moving lights (not shown) so as to move the moving lights to focus their beams on the frontmost, leftmost stage position.

It will be readily appreciated that the calibration is crucial to the present invention. The calibration must be completed after the camera is installed in a fixed position as the translational function derived through the calibration is based on the pixel of the view of the screen. Any change to the camera angle or position during calibration may upset this derived translational function and the calibration may have to be repeated.

After calibration, and when in use, the user-operated spotlight system allows a user, also referred to as an operator throughout this specification, to point the cursor 106 on the screen 100 to a position over the image 102 of the stage 104 and cause at least some of a plurality of spotlights (not shown) which are associated to that cursor 106 to move so as to illuminate that associated position on the stage 104 itself.

In certain implementations, one or more cameras may be moveable, and relocation or movement of the camera after calibration can be accommodated. In some instances, the calibration process identifies two or more fixed locations of a stage or performance space and the relationship between the fixed locations can be used for various purposes. In one example, the new or current location of a moveable camera can be calculated based on differences in relative location of two or more calibrated location observed by the moveable camera. The location of the moveable camera may be calculated by triangulation or by mathematical procedures. In some instances, other positional information may be employed to determine location of fixtures, including moveable cameras, and to adjust one or more operational parameters associated with the fixtures. Locational information may be obtained from global positioning system (GPS) receivers, proximity detectors, range-finding devices, etc.

Figure 2:
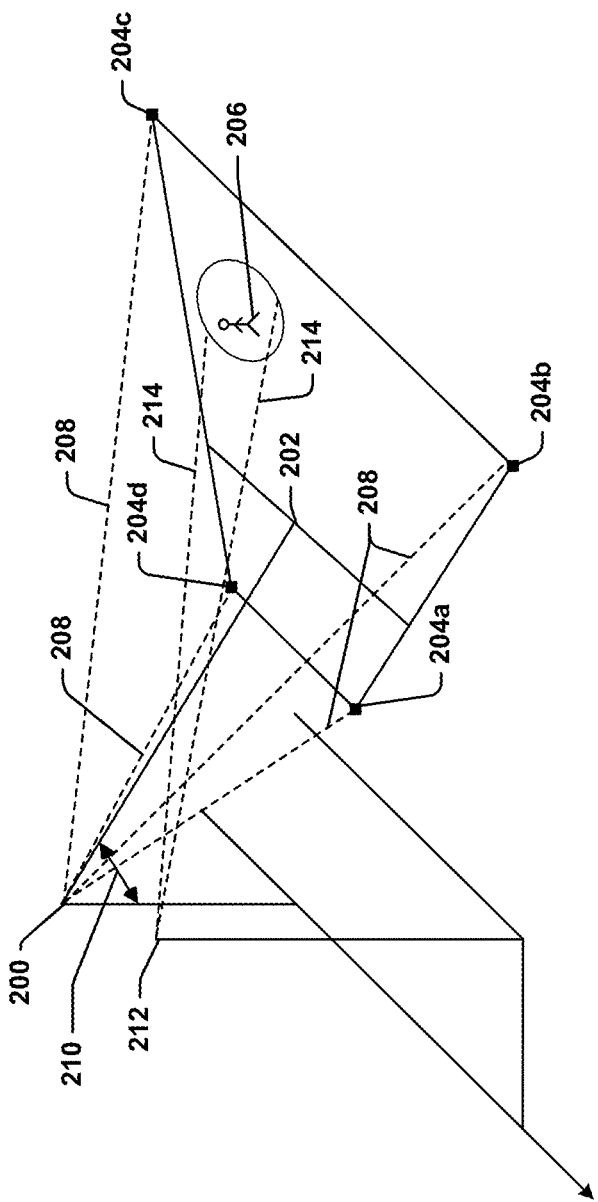
FIG. 2 is a diagrammatic view of a user-operated spotlight system in accordance with the present invention, showing a stage and camera angles and spotlight angles.

Referring to FIG. 2, there is provided a camera position 200 shown relative to a stage. The camera is directed to capture a centre point 202 of the stage in a central portion of the camera's field of vision. The stage is defined by corner points 204a, 204b, 204c, 204d and a performer 206 is shown ion the stage. The field of vision of the camera must capture at least all of the stage. The field of vision of the camera is indicated by field of vision lines 208. The camera angle 210 relative to the planar surface of the stage is shown.

A spotlight position 212 is shown such that the spotlight can be moved to illuminate the performer 206 on the stage. The focussed beam of the spotlight is indicated by lines 214.

The video camera is mounted at an angle 210, which is no greater than 45°, towards the stage. This angle 210 is used by the user-operated spotlight system in the mathematical calculation of the coordinate calculated between the cursor position on an operator screen, which may be given in terms of the pixel positions, and, a stage which is viewed by the video camera. Each screen pixel is calculated as a pixel that is transferred onto the stage. The camera displays the video on the screen from pixel (0, 0) to pixel (p1, p2). The uppermost pixel value is dependent on the screen resolution of the operator screen. Greater resolution will ultimately allow the present invention to have a greater and finer control of the moving lights over the stage. During calibration, the video camera horizontal field of view is used and an operator will measure the video camera angle so that each pixel on the screen is translated as a position on the stage. For example, an upper left pixel on the operator screen may be given as (0, 0) and this would be transferred as the upper left corner 204c of the stage. This calculated position co-ordinates is a translation function which is derived for each system setup as the views, on a pixel by pixel basis will be unique to each camera position setup.

Figure 3:
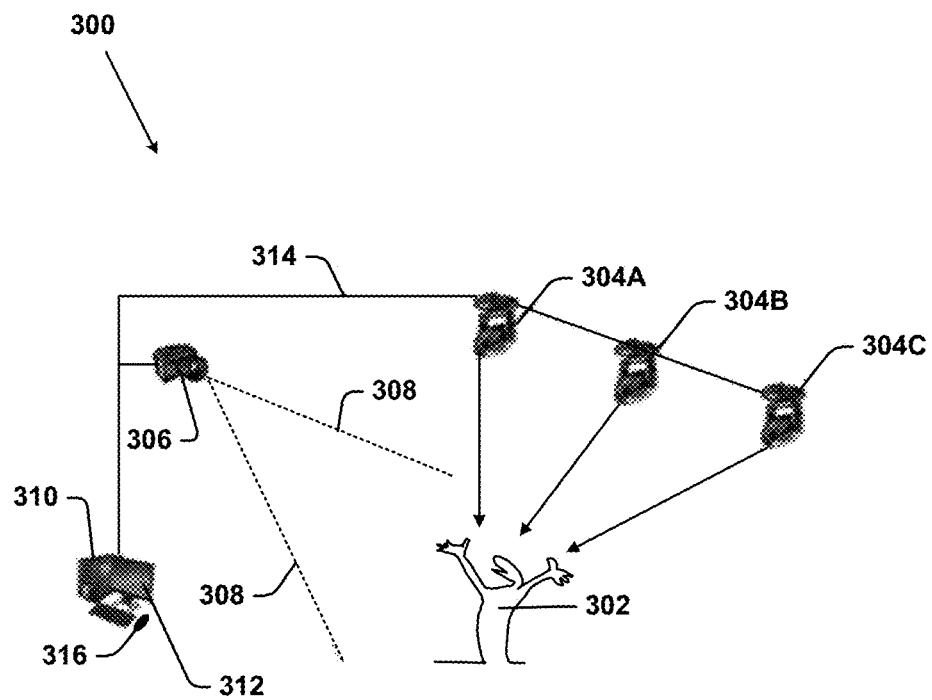
FIG. 3 is a diagrammatic view of a user-operated spotlight system in accordance with the present invention, the user-operated spotlight system comprising a single camera and plurality of moving spotlights.

With reference to FIG. 3, there is provided a user-operated spotlight system indicated generally by reference numeral 300. The user-operated spotlight system 300 is used for lighting a performer 302. The user-operated spotlight system 300 comprises one camera 306 which points at the performer 302 on a stage. The field of view of the camera 306 is defined by field of view lines 308 and during the setup it would be ensured that the entire stage sections visible to the audience would also be displayed on an operator screen 312.

A plurality of moving lights 304A, 304B, 304C which are controllable by the user-operated spotlight system 300 are connected to a processor 310 by a connection 314. In this example, in line with the DMX512 protocol, the plurality of moving lights 304A, 304B, 304C are connected in a daisy-chain arrangement. The processor 310 is connected to an operator screen 312. A screen cursor positioner 316 is provided to allow an operator (not shown) to move a cursor on the screen. The co-ordinates of the cursor position are calculated by the processor 310 into stage position co-ordinates which can be understood by the plurality of moving lights 304A, 304B, 304C. In one embodiment, this calculation outputs DMX512 co-ordinates which are understood by the plurality of moving lights 304A, 304B, 304C. The stage position co-ordinates are transmitted to the plurality of moving lights 304A, 304B, 304C which are then automatically moved to illuminate the stage position. The screen 312 displays an image of the stage captured by the camera 306. In this manner, the plurality of plurality of moving lights 304A, 304B, 304C are moved by an operator moving the cursor on the screen 312.

The plurality of moving lights 304A, 304B, 304C must be calibrated before they can be used for illuminating the performer 302. To accomplish this preperformance calibration setup, for every moving lights separately, two points on the stage are used in a following manner:

using pan and tilt values, the operator will move a light beam to any position on the stage;
this first position will have x and y coordinates in a stage pixels system, and this first position is marked as T1, for example;
using only tilt values, the operator will move the light beam to another position on the stage;
this second position will again have x and y coordinates in the stage pixels system, and this second position will be marked as T2, for example;
the calibration procedure has now marked two points (T1, T2) on the stage and knows the number of pan and tilt values that must be used for the particular moving light being calibrated to move a light beam from point T1 to point T2. It will be appreciated more than two points can be used to increase accuracy;
using these known values, coordinates for a moving light neutral position (which is when the moving light points directly down towards the stage along its longitudinal axis; in DMX512 values, this would be pan=128, tilt=128) are calculated as a home point in the stage pixel coordinate system;
using the home point coordinates, the required pan value and tilt value to direct the moving light at any point on the stage is calculated.

Using this calibration procedure any number of moving lights in any position regarding the stage can be setup as a moving light source. Each light will be positioned at different location in the gantry and in areas above and surrounding the stage, so the calibration must be carried out for each light individually. Each light will have its own mathematical function to convert pixel positions to a particular tilt and pan for that light so that it is directed towards the stage position.

Figure 4A:
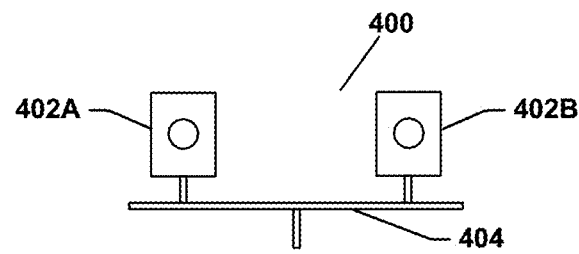
FIG. 4a is a diagrammatic view of a twin camera assembly as used in an embodiment of the present invention.
Figure 4B:
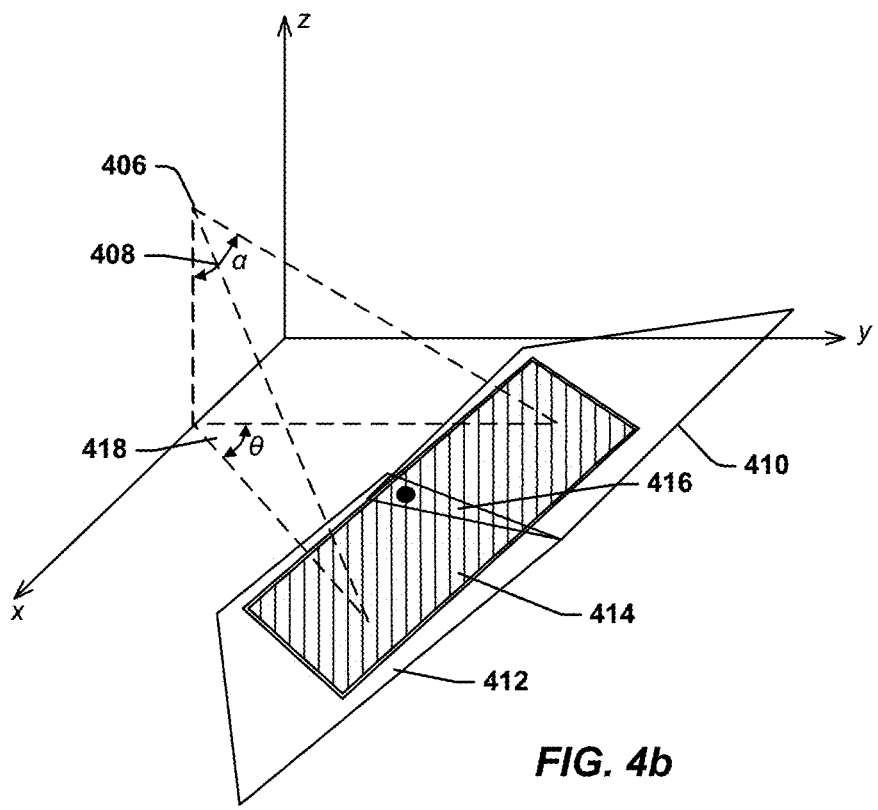
FIG. 4b is a diagrammatic view of a user-operated spotlight system in accordance with the twin camera embodiment of FIG. 4a, with the stage and camera angles and spotlight angles illustrated.

If a single camera cannot capture the stage using its field of view, a twin camera approach can be taken. As see in FIG. 4a, there is provided a twin camera assembly indicated generally by reference numeral 400. A pair of cameras 402A, 402B are mounted on a stand 404. Looking now at FIG. 4b, the twin camera assembly position 406 is arranged such that the cameras are held at a camera angle 408 from the vertical. A first field of view 410 for a first camera 402B and a second field of view 412 for a second camera 402A are shown. These fields of view 410, 412 cover the stage 414, which is shown in hatched lining. An overlap section 416 will exist between the fields of view 410, 412. An angle 418 between the direction of fields of view of the cameras is also shown. These angles are used during the setup when establishing the mathematical functions for each of the moving lights (not shown).

Figure 5A:
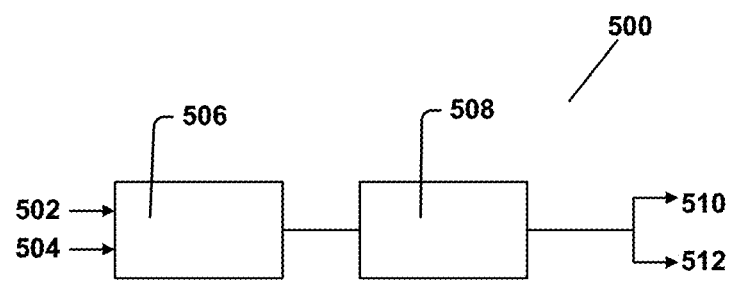
Figure 5B:
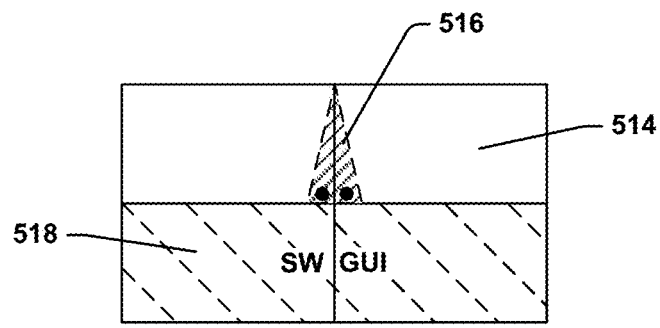
FIG. 5b is a diagrammatic view of a software graphic user interface as would be displayed on an operator screen for the user-operated spotlight system in accordance with the twin camera embodiment of FIG. 4a; and, FIG. 6 is a diagrammatic view of a user-operated spotlight system in accordance with an embodiment of the present invention, the user-operated spotlight system comprising a single camera, a single projector and a plurality of operator screens.

Referring to FIG. 5a, there is provided a multi-camera setup 500 which comprises a multi-channel viewer 506 which receives feed from at least two camera feeds 502, 504. The multi-channel feed is sent to a HDMI module 508 and is output as at least two operator screens outputs 510, 512. The operator screen view is shown in FIG. 5b and comprises the two camera feeds, which combine to give a stage view 514 with the overlap 516 section. A graphic user interface with various lights controls such as dimmers and so on can also be shown on screen I a GUI section 518.

Figure 6:
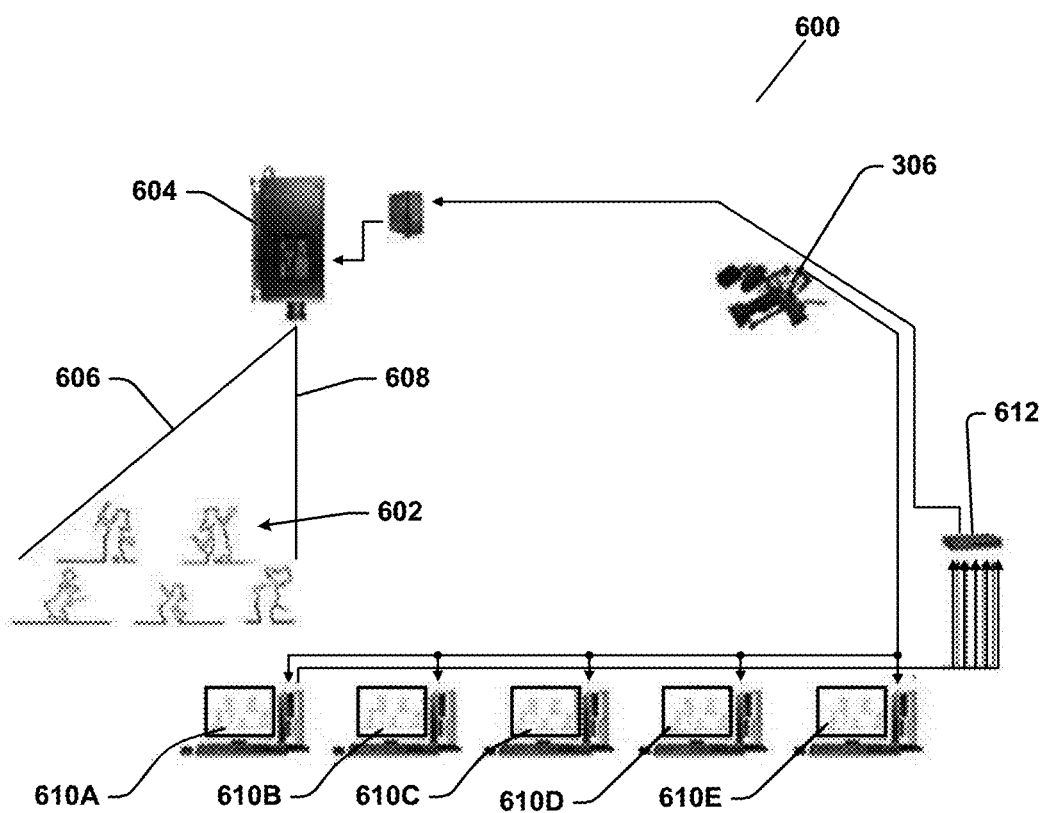

Turning now to FIG. 6, wherein like parts previously described have been assigned the same reference numerals, an alternative embodiment of the user-operated spotlight system indicated generally by reference numeral 600 is disclosed whereby a plurality of performers indicated generally by reference numeral 602 are shown on a stage. The performers 602 are illuminated by a stationary projector 604 instead of a plurality of moving lights. The stationary projector 604 must be capable of illuminating at point on the stage with the field of projection shown between field lines 606 and 608 in FIG. 6. The camera 306 captures the stage as before and a multitude of operator screens 610A, 610B, 610C, 610D, 610E are operated by a separate operator each, with each operator being assigned to a particular performer. The cursor position for each of the operator screens 610A, 610B, 610C, 610D, 610E is taken and accumulated by a processor 612 to produce an image pattern of white spots, which act as the lights, on a black background. This generated image will contain the spots for each of the performers in the position prescribed by the cursor positions on the operator screens 610A, 610B, 610C, 610D, 610E. The projector 604 is then feed this information and projects the white spots accordingly.

Instead of a projector, for multiple performers, moving lights can be used. The plurality of moving lights would be sub-divided into sets for each of the performers, with the cursor on each of the operator screens 610A, 610B, 610C, 610D, 610E being associated with one of each of the sets of the moving lights respectively.

It will be appreciated that any suitable type of light source can be used, provided the beam(s) of that light source can be moved about a stage.

In certain implementations, a plurality of cameras can be controlled in a fashion similar to the control of a light source disclosed herein, and a grouping or set of cameras can be controlled in a fashion similar to the control of sets of lights disclosed herein. In one example, a set of cameras can be caused to focus on a particular point in space, where that point in space is shown on an operator screen and a cursor on the screen can be used to change the point in space where the set of cameras are focused, and where the set of cameras may include one or more cameras. In some instances, the set of cameras may include one or more CCTV cameras.

In certain implementations, a plurality of microphones may be controlled in a fashion similar to the control of a light source disclosed herein and the plurality of microphones may be configured to act together to focus in on a point in a field of interest, including a games field, or sports field, theatre stage or other performance space.

According to certain aspects of this disclosure, movable cameras may be monitored, tracked and controlled. When a camera is stationary or is movable but remains stationary during a performance or event, the position of the camera in 3D space can be determined through direct measurement, determined through calculation (based on observations for example) and/or determined relative to other fixtures. Knowledge of the position of a stationary camera permits calculation and calibration of the location of various components in a system. When component location within a system is known with accuracy, movable elements within the system can be tracked. Such movable elements may include lights, movable cameras, projectors, scenery items, staging, performers or participants, and so on.

According to certain aspects of the disclosure, one or more movable cameras may be instrumented or configured to provide positional data to a controller or processor that can maintain a current location of each movable camera. The controller or processor may use calibration information to process the positional data and to calculate vectors representing movements and/or a current location in 3D space. In some implementations, the positional information can identify orientation, attitude and operational characteristics of each camera. In one example, a camera may be instrumented to provide current status periodically, after any change affecting orientation, attitude or other operational characteristics of the camera, and/or in response to a query from the controller or processor.

In accordance with certain aspects, a camera may be configured to receive control signals from the controller or processor that cause the camera to track a performer. In some implementations, the location and/or orientation of a movable camera may change when the camera is tracking a performer. One or more lights may be concurrently controlled to track the performer and/or adjust the lighting of the performer based on changes on position of the performer and/or changes in position or mode of operation of one or more cameras.

According to certain aspects, the movement of a camera may be calibrated during setup, configuration or in response to corrections made during a performance. In one example, calibration of a movable camera may enable the controller or processor to generate control signals that cause the moveable camera to be moved with precision to a desired location. In some examples, calibration of a movable camera may take into consideration the position and/or movement of other fixtures, including one or more lights and one or more other cameras. In certain examples, calibration of a movable camera and/or other fixtures may be performed when the system is tracking a performer during a calibration process.

The manner in which a movable camera is calibrated to moving lights and/or other fixtures may be similar to the calibration of a stationary camera. The movable camera may be initially calibrated such that the position of the movable camera is reliably known. The lights may be similarly calibrated such that the position of a moving light is reliably known. A joint calibration of cameras and other fixtures may be performed such that one or more movable cameras and other movable fixtures move in response to movement of a cursor monitored by the controller or processor. In one example, an operator may point the cursor at a position on a display and the position and configuration of movable cameras and other movable fixtures is modified to point at a corresponding physical position on a stage or performance space. The joint calibration of cameras and other fixtures may provide instant tracking of a movable camera simultaneously with other cameras, moving lights or movable instruments such as microphones and projectors.

In one example, a camera and light may be pointed at one or more calibration positions, where the calibration positions have been selected based on positions at which the light and the movable camera have previously been calibrated. The operation of the camera and light is known at the calibration positions and interaction with the cursor can be calibrated in a manner that provides instant tracking of the movable camera in synchronism with other cameras, moving lights or movable instruments such as microphones and projectors. Successful calibration can enable the movable cameras, lights and other fixtures to instantly follow cursor movements.

In some implementations, operating characteristics of cameras, lights, projection systems, scenic control systems and audio systems such as microphones and other fixtures may be calibrated. In one example, characteristics that may be calibrated include parameters that configure zoom, aperture, focus, colour and other operating characteristics of a camera.

In another example, characteristics that may be calibrated include parameters that configure dimmer, iris, zoom, focus, colour and other operating characteristics of a light fixture. Calibration can enable control based upon position in the performance space or preprogramed locations that elicit an automatic response from the system. Calibration performed to track the position of a single light or a plurality of lights can be used to configure a correct or desired adjustment for dimming, iris, focus and zoom values of the beam. For example, when a performer moves further away from a light, the zoom and iris settings may be required to reduce in order to maintain the same beam size. The focus value may also be adjusted to maintain the correct focusing of the light. The intensity of the output light, which may be controlled using a dimmer value, is typically increased as the performer moves further away from the light in order to maintain the same overall intensity of the beam on a performer.

The operating configuration of a camera may be adjusted to accommodate changes in distance and beam format. Adjustment of the camera enables an operator to control magnification of the image of a performer or scene when the camera is used to project captured images onto large screens for an audience.

In some implementations, a camera, light, microphone and/or other fixture may be instrumented to detect and communicate changes in location, orientation and/or configuration. In one example, sensors coupled to the camera, light, microphone and/or other fixture may generate data that can be processed to generate location, orientation and/or configuration information used by a controlling device to manage aspects of a system during performance. In some instances, an instrumented fixture may serve as a master fixture that controls movement of one or more other fixtures. The master fixture may be used in place of, or in addition to a pointer that controls a cursor on a display. In one example, a controlling system may be configured to monitor a master spotlight (referred to here as a master follow spot) and to cause other spotlights (follow spots) to point at the same location as the master follow spot. Manipulation of the master follow spot may cause corresponding manipulations of any number of fixtures, including movable cameras, movable lights, projectors, scenic controls, performer flying systems, etc.

A fixture may be fitted with sensors, electronics, controllers, processors, communication devices and/or other components that enable the fixture to operate as a master fixture. In various examples, a spotlight, microphone system or camera may be operable as a master fixture. In certain examples, the master fixture may be an emulator that can be manipulated by an operator to control multiple fixtures during a performance or show. The emulator may be mounted on a gimbal system (see FIG. 7) and may include a processing system that function as a controller. In some examples, the emulator may be constructed from a non-functional or mock-up fixture (light, camera) that can be manipulated by an operator to control multiple fixtures during a performance or show. In some instances, the master fixture may be calibrated with a cursor that controls a pointer on a display screen. In one example, a calibration is accomplished using a follow spot beam and the pointer on the display screen, other fixtures can be calibrated to move in correspondence with the master follow spot.

Figure 7:
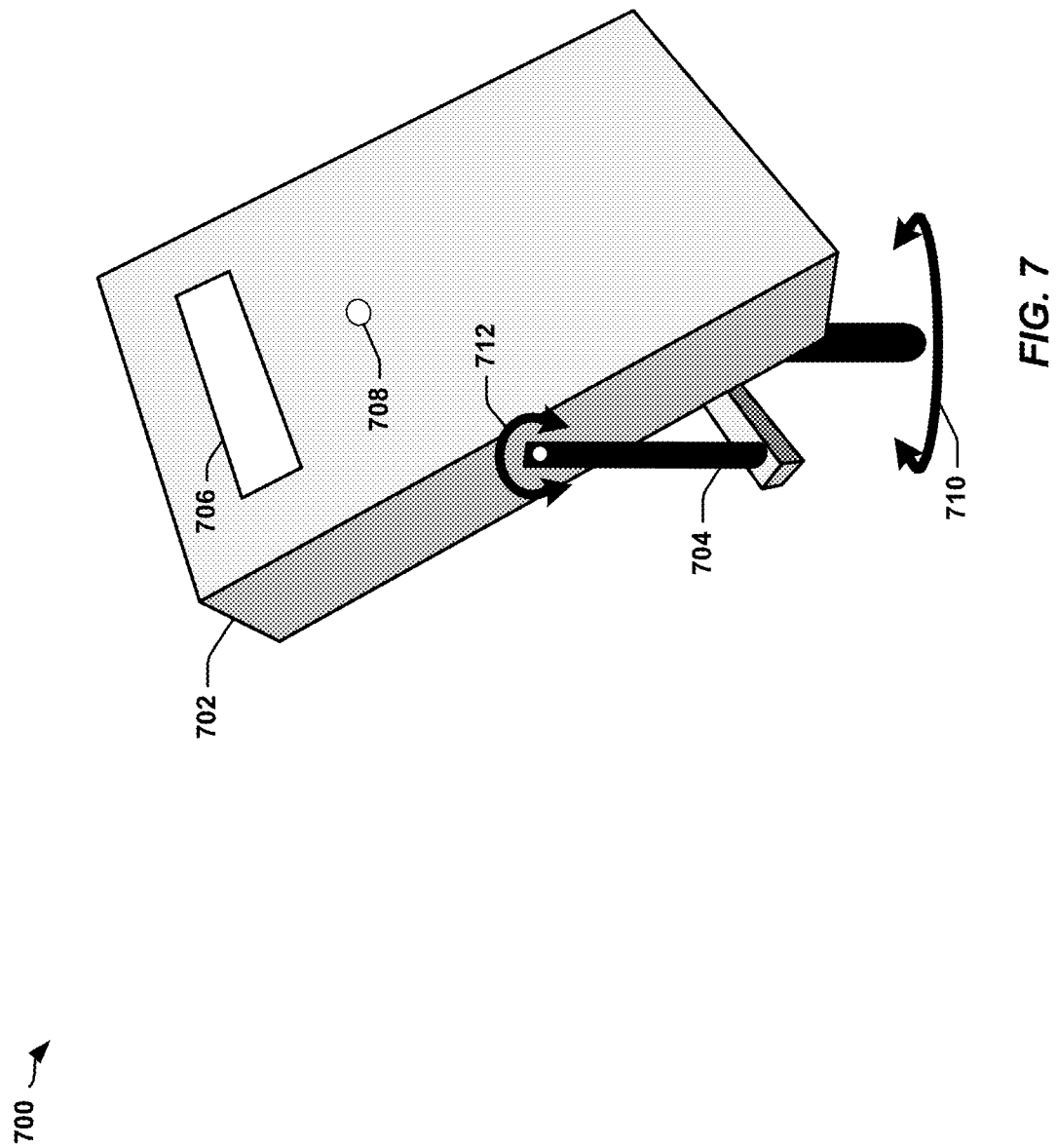
FIG. 7 illustrates one example of an emulator provided in accordance with certain aspects disclosed herein.

FIG. 7 illustrates one example of an emulator apparatus 700 that may be provided in accordance with certain aspects disclosed herein. The emulator apparatus 700 in the example includes an enclosure 702 mounted on a gimbal system 704 that allows the enclosure to move in three-dimensional space. In the illustrated example, the enclosure 702 is mounted on a gimbal system 704 that enables rotation 710 around a vertical axis (pan) and rotation 712 around a horizontal axis (tilt). In other examples, the enclosure 702 may be mounted on a light fixture, camera, microphone system or the like using a bracket or other fastening device. When mounted using a bracket, the bracket may be configured to align or orient the enclosure 702 as needed or desired. In some implementations, the enclosure may be mounted on a follow spot, camera or other stationary or moveable fixture or device.

The enclosure 702 may house processing circuits, sensors, communication devices, etc., configured to support calibration and control of a lighting system and/or one or more cameras. The enclosure 702 may include or have an attached display 706 and/or one or more control input buttons 708. The display may include a graphical display capable of providing a video image, an alphanumeric display, one or more indicator lamps, or some combination thereof. In one example, the enclosure 702 is part of, or includes a tablet computer configured to perform one or more functions disclosed herein.

Figure 8:
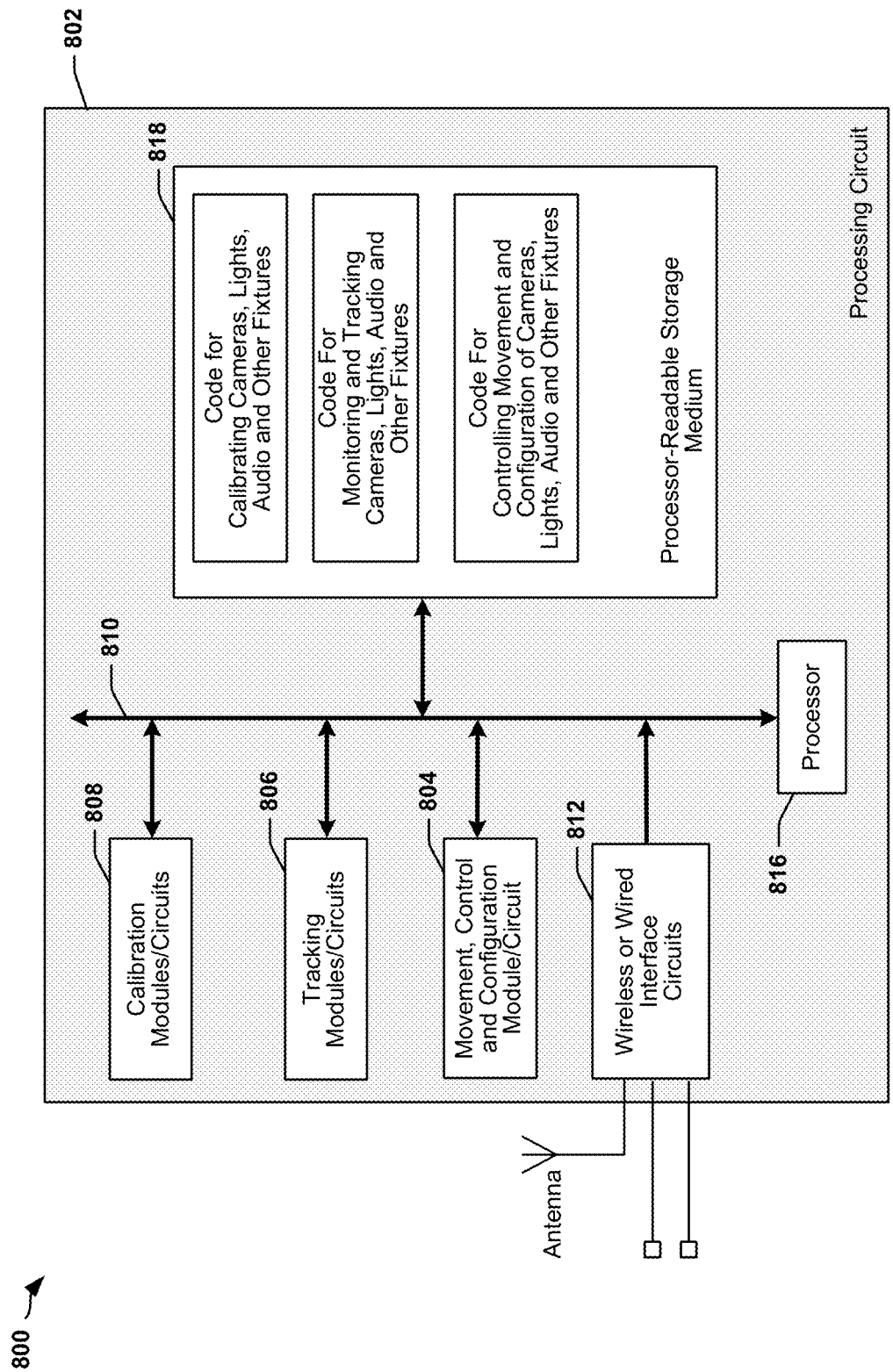
FIG. 8 is a diagram illustrating an example of a hardware implementation for a controlling apparatus in accordance with certain aspects disclosed herein.

The emulator apparatus 700 may be deployed in a system the control one of more lights. The emulator apparatus 700 may be mounted, fitted to, or otherwise incorporated in a follow spot. The emulator apparatus 700 may be configured to move in a manner that emulates a traditional follow spot. The emulator apparatus 700 may include a processing circuit or other electronics configured to move a cursor on a display in response to movements of the emulator. An example of a processing circuit 802 is illustrated in FIG. 8. In some instances, a computer mouse, trackpad or other pointer configured to move the cursor on the display may serve as an emulator.

In one example, the emulator apparatus 700 may be attached to any traditional follow spot, and permits a user to use the resulting master follow spot to control one or more moving lights or moving mirror type lights. the emulator apparatus 700 may provide the same type of control output as a mouse-based system and may operate to move a pointer on a screen. The pointer may be displayed as a cursor or icon, for example. The pointer identifies a point in space that can be mathematically represented. Movements and adjustments of lighting systems, audio system, and/or camera systems may be calculated and initiated using processing circuits provided in the emulator apparatus 700.

Control of lighting systems, audio system, and/or camera systems may be automated. Automated control of a moving light system may include the calculation and setting of parameters, such as dimmer, iris, focus and zoom setting. For example, various parameters that configure operation of a light fixture or system may be automatically adjusted when a light fixture moves such that the size, intensity and focus characteristics of a spot of light incident on a performer or location in a performance space is unchanged after movement. In the latter example, beam size, brightness, focus, iris, zoom and/or any other operational parameter associated the light fixture may be automatically controlled based on information obtained during calibration.

In some implementations, a camera can be fixed or stationary. The camera may be operated to pan and tilt automatically in response to movement of a mouse or emulator. In some instances, the pan and tilt of a moveable camera may be controlled by a remote device that has equal planes of movement in pan and tilt. Focus, aperture, zoom, sensitivity and/or any other operational parameter of the camera may be adjusted as the pan and tilt of the moveable camera is adjusted. Furthermore, Focus, aperture, zoom, sensitivity and/or any other operational parameter of the camera may be adjusted as the beam size, brightness, focus, iris, zoom and/or any other operational parameter of one or more lighting fixtures is modified.

FIG. 8 is a diagram illustrating an example of a hardware implementation for an apparatus 800 employing a processing circuit 802. The apparatus 800 may be used for calibrating, monitoring, configuring and controlling movement of cameras, lights, audio and other fixtures. The processing circuit typically has a processor 816 that may include one or more microprocessor, microcontroller, digital signal processor, sequencer or state machine. The processing circuit 802 may be implemented with a bus architecture, represented generally by the bus 810. The bus 810 may include any number of interconnecting buses and bridges depending on the specific application of the processing circuit 802 and the overall design constraints. The bus 810 links together various circuits including one or more processors and/or hardware modules, represented by the processor 816, the modules or circuits 804, 806 and 808, communication interface circuits 812, and the processor-readable storage medium 818. The bus 810 may also link various other circuits such as timing sources, peripherals, voltage regulators, and power management circuits, which are well known in the art, and therefore, will not be described any further.

The processor 816 is responsible for general processing, including the execution of software stored on the processor-readable storage medium 818. The software, when executed by the processor 816, causes the processing circuit 802 to perform the various functions described in this disclosure for any particular apparatus. The processor-readable storage medium 818 may also be used for storing data that is manipulated by the processor 816 when executing software, including configuration, calibration and location information for one or more devices coupled to the apparatus 800. The processing circuit 802 further includes at least one of the modules 804, 806 and 808. The modules 804, 806 and 808 may be implemented as software modules running in the processor 816, resident/stored in the processor-readable storage medium 818, one or more hardware modules coupled to the processor 816, or some combination thereof. The modules 804, 806 and/or 808 may include microcontroller instructions, state machine configuration parameters, or some combination thereof.

In one configuration, the apparatus 800 may be configured for controlling calibrating and/or managing a performance. The apparatus 800 may include a module and/or circuit 804 that is configured to control the movement of cameras, lights, audio and other fixtures and/or to configure operating characteristics of the cameras, lights, audio or other fixtures. The apparatus 800 may include tracking modules and/or circuits 806 configured to monitor, identify and/or calculate the location of one or more cameras, lights, audio or other fixtures. The apparatus 800 may include calibration modules and/or circuits 806 configured to manage calibration of one or more cameras, lights, audio or other fixtures.

In one example, the apparatus 800 has a display system, one or more cameras, one or more controllable spotlights, a pointing device operable to move a cursor displayed on the display system and a controller. The controller may be configured to cause the display system to display an image of the performance space provided by the one or more cameras, move one or more controllable spotlights in correspondence with movement of the cursor displayed on the display system, and calibrate the spotlight system by linking one or more cursor positions on the image of the performance space with one or more corresponding physical locations on the performance space.

The pointing device may be implemented using a master spotlight. The master spotlight may be configured to communicate location information to the controller. The location information may be derived from data obtained from one or more sensors coupled to the master spotlight. The controller may be further configured to cause one or more beams produced by the one or more controllable spotlights to converge at a physical location on the performance space indicated by the location information.

The controller may be configured to configure a parameter of at least one controllable spotlight responsive to the movement of the cursor displayed on the display system. The parameter may be a dimming value, an iris setting, a focus setting, a zoom setting or a colour control parameter. Multiple parameters may be configured responsive to the movement of the cursor.

The controller may be configured to calibrate the spotlight system such that at least two cursor positions on the display system displaying the performance space are linked with at least two physical positions on the performance space.

The one or more cameras may include a moveable camera. The controller may be further configured to cause the moveable camera to move in correspondence with movement of the pointing device. The controller may be configured to configure an operating parameter of the moveable camera responsive to the movement of the pointing device. The operating parameter may be a zoom setting, aperture setting, focus setting or colour control parameter. Multiple operating parameters may be configured responsive to the movement of the pointing device.

Figure 9:
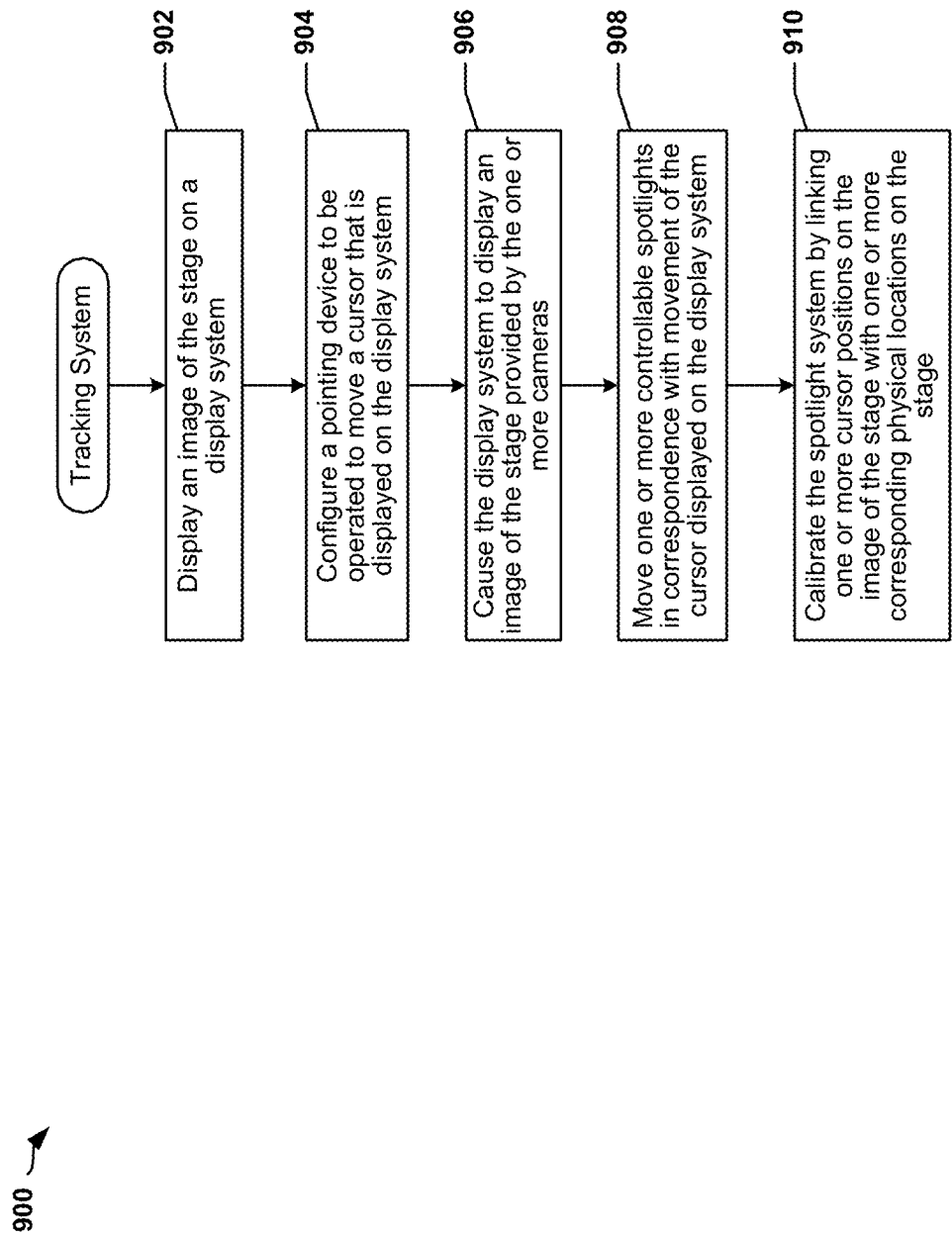
FIG. 9 is a flowchart illustrating a method of operating a spotlight system for lighting a performer on a stage or performance space in accordance with certain aspects disclosed herein.

The processor-readable storage medium 818 may store instructions and other information related to the method illustrated in FIG. 9. For example, the processor-readable storage medium 818 may include instructions that cause the processing circuit 802 to display an image of the performance space on a display system, configure a pointing device to be operated to move a cursor that is displayed on the display system, cause the display system to display an image of the performance space provided by the one or more cameras, cause one or more controllable spotlights to be moved in correspondence with movement of the cursor displayed on the display system, and calibrate the spotlight system by linking one or more cursor positions on the image of the performance space with one or more corresponding physical locations on the performance space. The pointing device may be implemented as a follow spot, an emulator, mouse or other device.

In certain examples, the pointing device comprises a master spotlight. The instructions may cause the processing circuit 802 to receive location information from the master spotlight. The location information may be derived from data obtained from one or more sensors coupled to the master spotlight. Responsive to the instructions, the processing circuit 802 may cause one or more beams produced by the one or more controllable spotlights to converge at a physical location on the performance space indicated by the location information.

In some implementations, the instructions may cause the processing circuit 802 to configure a parameter of at least one controllable spotlight responsive to the movement of the cursor displayed on the display system. The parameter may be a dimming value, an iris setting, a focus setting, a zoom setting or a colour control parameter. Multiple parameters may be configured responsive to the movement of the cursor.

In some instances, the instructions may cause the processing circuit 802 to calibrate the spotlight system such that at least two cursor positions on the display system displaying the performance space are linked with at least two physical positions on the performance space.

In certain implementations, a moveable camera is included in the one or more cameras. The processing circuit 802 may cause the moveable camera to move in correspondence with movement of the pointing device. The instructions may cause the processing circuit 802 to configure an operating parameter of the moveable camera responsive to the movement of the pointing device. The operating parameter may be a zoom setting, aperture setting, focus setting or colour control parameter. Multiple operating parameters may be configured responsive to the movement of the pointing device.

FIG. 9 is a flowchart 900 illustrating a method of operating a spotlight system for lighting a performer on a stage or performance space in accordance with certain aspects disclosed herein. In one example, the method is performed by the processor 816 illustrated in FIG. 8. At block 902, the processor 816 may display an image of the performance space on a display system. At block 904, the processor 816 may configure a pointing device to be operated to move a cursor that is displayed on the display system. The pointing device may be implemented as a follow spot, an emulator, mouse or other device. At block 906, the processor 816 may cause the display system to display an image of the performance space provided by the one or more cameras. At block 908, the processor 816 may move one or more controllable spotlights in correspondence with movement of the cursor displayed on the display system. At block 910, the processor may calibrate the spotlight system by linking one or more cursor positions on the image of the performance space with one or more corresponding physical locations on the performance space.

In certain examples, the pointing device comprises a master spotlight. The processor 816 may receive location information from the master spotlight. The location information may be derived from data obtained from one or more sensors coupled to the master spotlight. The processor 816 may cause one or more beams produced by the one or more controllable spotlights to converge at a physical location on the performance space indicated by the location information.

In some implementations, the processor 816 may configure a parameter of at least one controllable spotlight responsive to the movement of the cursor displayed on the display system. The parameter may be a dimming value, an iris setting, a focus setting, a zoom setting or a colour control parameter. Multiple parameters may be configured responsive to the movement of the cursor.

In some instances, the processor 816 may calibrate the spotlight system such that at least two cursor positions on the display system displaying the performance space are linked with at least two physical positions on the performance space.

In certain implementations, a moveable camera is included in the one or more cameras. The processor 816 may cause the moveable camera to move in correspondence with movement of the pointing device. The processor 816 may configure an operating parameter of the moveable camera responsive to the movement of the pointing device. The operating parameter may be a zoom setting, aperture setting, focus setting or colour control parameter. Multiple operating parameters may be configured responsive to the movement of the pointing device.

The terms "comprise" and "include", and any variations thereof required for grammatical reasons, are to be considered as interchangeable and accorded the widest possible interpretation. It will be understood that the components shown in any of the drawings are not necessarily drawn to scale, and, like parts shown in several drawings are designated the same reference numerals. It will be further understood that features from any of the embodiments may be combined with alternative described embodiments, even if such a combination is not explicitly recited hereinbefore but would be understood to be technically feasible by the person skilled in the art.

The embodiments in the invention described with reference to the drawings comprise a computer apparatus and/or processes performed in a computer apparatus or processor. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

The invention is not limited to the embodiments hereinbefore described which may be varied in both construction and detail.

What is claimed is:

1. A spotlight system for tracking a performer in a performance space, comprising:
    a pointing device operable to move a cursor displayed on a display system; and
    a controller configured to:
        cause the display system to display an image of the performance space provided by one or more cameras;
        move at least one camera in correspondence with movement of the pointing device or movement of the cursor displayed on the display system; and
        calibrate the spotlight system by linking one or more cursor positions on the image of the performance space with one or more corresponding physical locations on the performance space.

2. The system of claim 1, wherein the pointing device comprises a master spotlight.

3. The system of claim 1, wherein the pointing device is attached to a camera.

4. The system of claim 1, wherein the pointing device comprises an emulator.

5. The system of claim 1, wherein the pointing device is configured to:
    communicate location information to the controller, the location information being derived from data obtained from one or more sensors coupled to the pointing device.

6. The system of claim 5, wherein the controller is configured to:
    cause one or more beams produced by a plurality of controllable spotlights to converge at a physical location on the performance space indicated by the location information.

7. The system of claim 1, wherein the controller is configured to:
    configure a parameter of at least one controllable spotlight responsive to the movement of the cursor displayed on the display system, wherein the parameter comprises a dimming value, an iris setting, a focus setting, a zoom setting or a colour control parameter.

8. The system of claim 1, wherein the controller is configured to:
    calibrate the spotlight system such that at least two cursor positions on the display system displaying the performance space are linked with at least two physical positions on the performance space.

9. The system of claim 1, wherein the one or more cameras includes a moveable camera and the controller is configured to:
    cause the moveable camera to move in correspondence with movement of the pointing device.

10. The system of claim 9, wherein the controller is configured to:

configure an operating parameter of the moveable camera responsive to the movement of the pointing device, wherein the operating parameter comprises a zoom setting, aperture setting, focus setting or colour control parameter.

11. A method for operating a spotlight system configured to track a performer in a performance space, comprising:
causing a display system to display an image of the performance space provided by one or more cameras;
moving a first camera in correspondence with movement of a pointing device or movement of a cursor displayed on the display system, wherein the pointing device is configured to move the cursor displayed on the display system; and
calibrating the spotlight system by linking one or more cursor positions on the image of the performance space with one or more corresponding physical locations on the performance space.

12. The method of claim 11, wherein the pointing device comprises a master spotlight.

13. The method of claim 11, wherein the pointing device is attached to a second camera.

14. The method of claim 11, wherein the pointing device comprises an emulator.

15. The method of claim 11, wherein the pointing device is configured to provide location information, the location information being derived from data obtained from one or more sensors coupled to the pointing device.

16. The method of claim 15, further comprising:
causing one or more beams produced by a plurality of controllable spotlights to converge at a physical location on the performance space indicated by the location information.

17. The method of claim 11, further comprising:
configuring a parameter of at least one controllable spotlight responsive to the movement of the cursor displayed on the display system, wherein the parameter comprises a dimming value, an iris setting, a focus setting, a zoom setting or a colour control parameter.

18. The method of claim 11, further comprising:
calibrating the spotlight system such that at least two cursor positions on the display system displaying the performance space are linked with at least two physical positions on the performance space.

19. The method of claim 11, further comprising:
configuring an operating parameter of the first camera responsive to the movement of the pointing device, wherein the operating parameter comprises a zoom setting, aperture setting, focus setting or colour control parameter.

* * * * *